US012707478B2

(12) United States Patent
Park et al.

(10) Patent No.: US 12,707,478 B2
(45) Date of Patent: Aug. 11, 2026

(54) METHOD AND APPARATUS FOR PERFORMING SL DRX OPERATION IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 305 days.

(21) Appl. No.: 18/290,428

(22) PCT Filed: May 18, 2022

(86) PCT No.: PCT/KR2022/007121
§ 371 (c)(1),
(2) Date: Nov. 13, 2023

(87) PCT Pub. No.: WO2022/245133
PCT Pub. Date: Nov. 24, 2022

(65) Prior Publication Data

US 2024/0260055 A1 Aug. 1, 2024

(30) Foreign Application Priority Data

May 18, 2021 (KR) ........................ 10-2021-0063863

(51) Int. Cl.

| | |
|---|---|
| ***H04W 76/28*** | (2018.01) |
| ***H04L 1/1829*** | (2023.01) |
| ***H04W 72/25*** | (2023.01) |

(52) U.S. Cl.
CPC ........... *H04W 72/25* (2023.01); *H04L 1/1851* (2013.01); *H04W 76/28* (2018.02)

(58) Field of Classification Search
CPC ....... H04W 92/18; H04W 76/28; H04W 4/40; H04W 72/25; H04W 72/40;
(Continued)

(56) References Cited

U.S. PATENT DOCUMENTS

2023/0363048 A1* 11/2023 Park ................. H04W 28/0268

OTHER PUBLICATIONS

European Patent Office Application Serial No. 22804987.0, Search Report dated May 22, 2025, 10 pages.

(Continued)

*Primary Examiner* — Tu X Nguyen
(74) *Attorney, Agent, or Firm* — LEE, HONG, DEGERMAN, KANG & WAIMEY

(57) ABSTRACT

Provided are a method for performing wireless communication by a first device, and an apparatus for supporting same. The method may comprise the steps of: receiving information related to a configured grant (CG) from a base station through at least one of downlink control information (DCI) and a radio resource control (RRC) message; on the basis of a first sidelink (SL) resource in a period allocated by the CG, transmitting second sidelink control information (SCI) and first SCI for scheduling a physical sidelink shared channel (PSSCH) to a second device through a physical sidelink control channel (PSCCH); and on the basis of the first SL resource in the period, transmitting the second SCI and a medium access control (MAC) protocol data unit (PDU) to the second device through the PSSCH.

17 Claims, 15 Drawing Sheets

(58) Field of Classification Search
CPC . H04W 72/0446; H04W 72/232; H04W 4/70; H04W 4/46; H04W 76/38; H04W 76/27; H04W 52/383; H04W 72/231; H04W 72/23
See application file for complete search history.

(56) References Cited

OTHER PUBLICATIONS

LG Electronics Inc., "Corrections to 5G V2X with NR Sidelink," R2-2003523, 3GPP TSG-RAN WG2 Meeting #109B-e, Online, Apr. 2020, 19 pages.
Huawei et al., "Consideration on the sidelink DRX for unicast," R2-2105083, 3GPP TSG-RAN WG2 Meeting #114-e, Online, May 2021, 11 pages.

* cited by examiner

FIG. 2

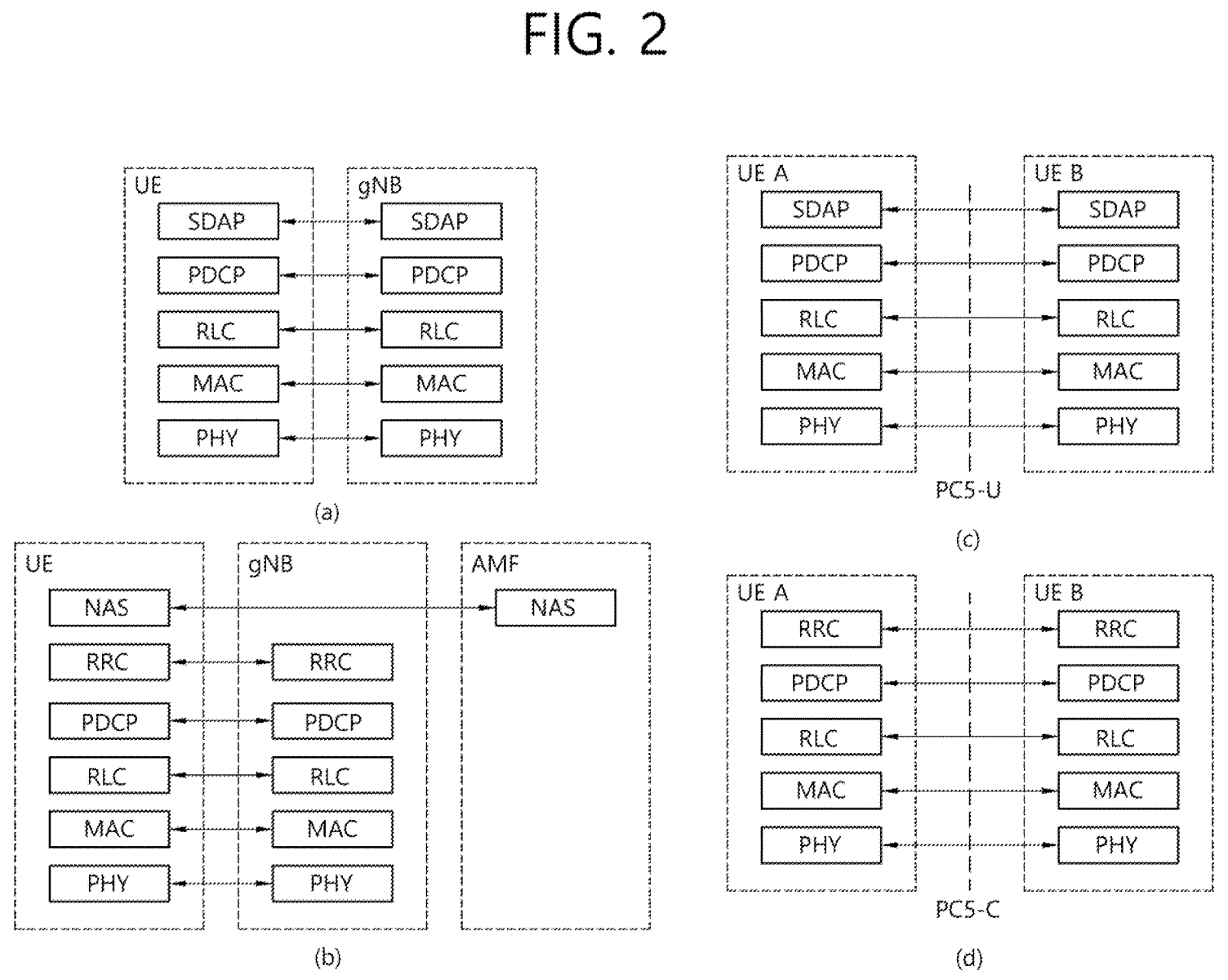

UE
SDAP
PDCP
RLC
MAC
PHY gNB
SDAP
PDCP
RLC
MAC
PHY (a)

UE
NAS
RRC
PDCP
RLC
MAC
PHY gNB
RRC
PDCP
RLC
MAC
PHY

AMF
NAS (b)

UE A
SDAP
PDCP
RLC
MAC
PHY

PC5-U

UE B
SDAP
PDCP
RLC
MAC
PHY (c)

UE A
RRC
PDCP
RLC
MAC
PHY

PC5-C

UE B
RRC
PDCP
RLC
MAC
PHY (d)

Figure 18:
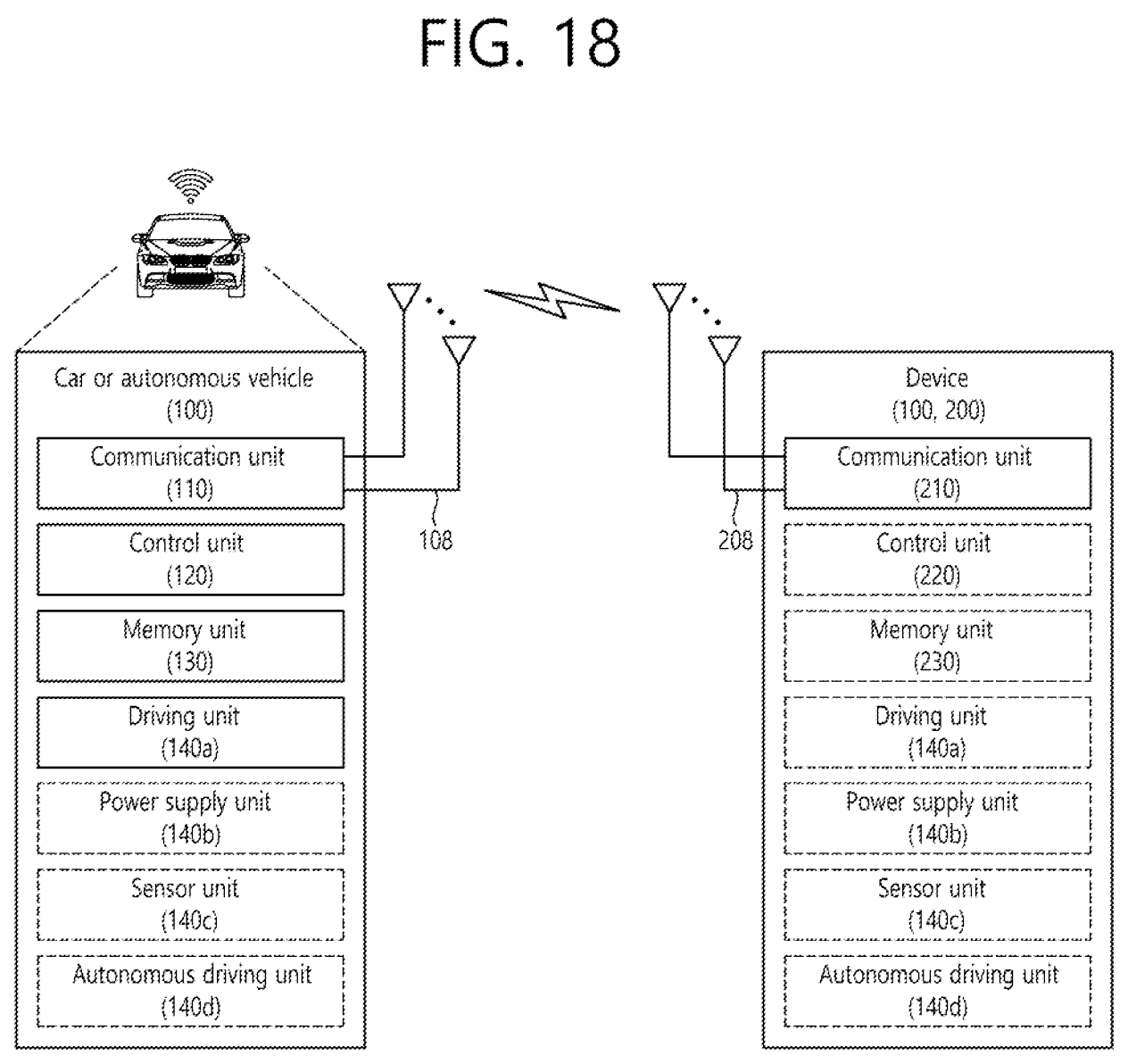

Car or autonomous vehicle (100)
Communication unit (110)
Control unit (120)
Memory unit (130)
Driving unit (140a)
Power supply unit (140b)
Sensor unit (140c)
Autonomous driving unit (140d)

108

208

Device (100, 200)
Communication unit (210)
Control unit (220)
Memory unit (230)
Driving unit (140a)
Power supply unit (140b)
Sensor unit (140c)
Autonomous driving unit (140d)

METHOD AND APPARATUS FOR PERFORMING SL DRX OPERATION IN NR V2X

CROSS-REFERENCE TO RELATED APPLICATIONS

This application is the National Stage filing under 35 U.S.C. 371 of International Application No. PCT/KR2022/007121, filed on May 18, 2022, which claims the benefit of earlier filing date and right of priority to Korean Application No. 10-2021-0063863, filed on May 18, 2021, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of a base station. SL communication is under consideration as a solution to the overhead of a base station caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, when the RX UE performs SL DRX operation, the TX UE may determine that retransmission or other initial transmission to the RX UE is required. In this case, the TX UE may need to indicate the RX UE that is the subject of the retransmission or other initial transmission to extend or maintain an active time.

In an embodiment, provided is a method for performing wireless communication by a first device. The method may comprise: receiving, from a base station, information related to a configured grant (CG), through at least one of downlink control information (DCI) or a radio resource control (RRC) message; transmitting, to a second device through a physical sidelink control channel (PSCCH), first sidelink control information (SCI) for scheduling of a physical sidelink shared channel (PSSCH) and second SCI, based on a first sidelink (SL) resource within a period allocated by the CG; and transmitting, to the second device through the PSSCH, the second SCI and a medium access control (MAC) protocol data unit (PDU), based on the first SL resource within the period, wherein, based on that the first SL resource is a last SL resource among at least one SL resource within the period, information related to an active state is included in the first SCI or the second SCI.

In an embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: receive, from a base station, information related to a configured grant (CG), through at least one of downlink control information (DCI) or a radio resource control (RRC) message; transmit, to a second device through a physical sidelink control channel (PSCCH), first sidelink control information (SCI) for scheduling of a physical sidelink shared channel (PSSCH) and second SCI, based on a first sidelink (SL) resource within a period allocated by the CG; and transmit, to the second device through the PSSCH, the second SCI and a medium access control (MAC) protocol data unit (PDU), based on the first SL resource within the period, wherein, based on that the first SL resource is a last SL resource among at least one SL resource within the period, information related to an active state is included in the first SCI or the second SCI.

In an embodiment, provided is an apparatus adapted to control a first user equipment (UE). The apparatus may comprise: one or more processors; and one or more memories operably connected to the one or more processors and storing instructions. The one or more processors may execute the instructions to: receive, from a base station, information related to a configured grant (CG), through at least one of downlink control information (DCI) or a radio resource control (RRC) message; transmit, to a second UE through a physical sidelink control channel (PSCCH), first sidelink control information (SCI) for scheduling of a physical sidelink shared channel (PSSCH) and second SCI, based on a first sidelink (SL) resource within a period allocated by the CG; and transmit, to the second UE through the PSSCH, the second SCI and a medium access control (MAC) protocol data unit (PDU), based on the first SL resource within the period, wherein, based on that the first SL resource is a last SL resource among at least one SL resource within the period, information related to an active state is included in the first SCI or the second SCI.

In SL communication for a UE performing SL DRX operation, reliability of SL communication can be secured.

BRIEF DESCRIPTION OF THE DRAWINGS

FIG. 2 shows a radio protocol architecture, based on an embodiment of the present disclosure.

FIG. 18 shows a vehicle or an autonomous vehicle, based on an embodiment of the present disclosure.

DETAILED DESCRIPTION

Figure 1:
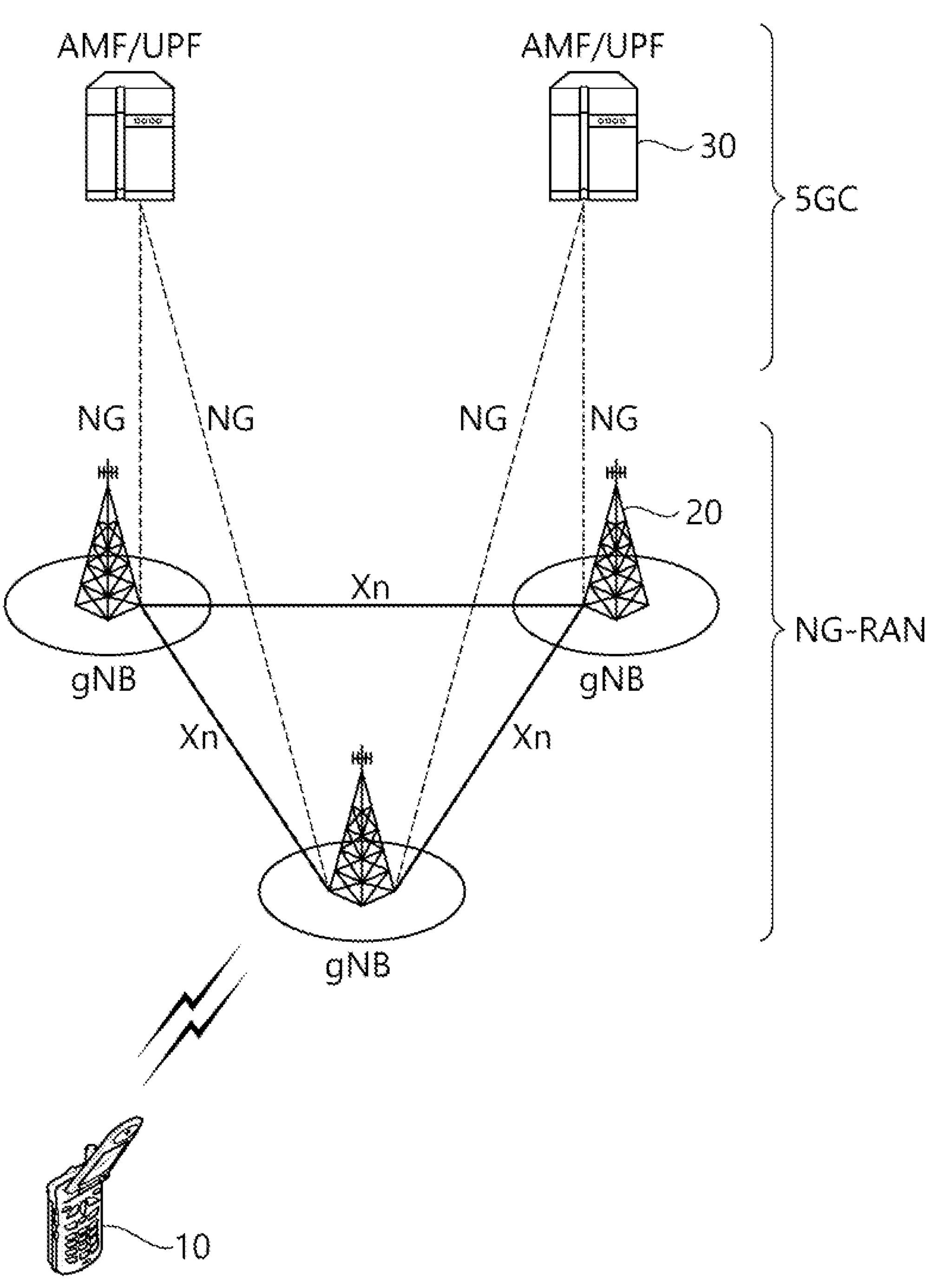
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHZ, middle frequency bands ranging from 1 GHZ to 10 GHZ, high frequency (millimeter waves) of 24 GHZ or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (Qos) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
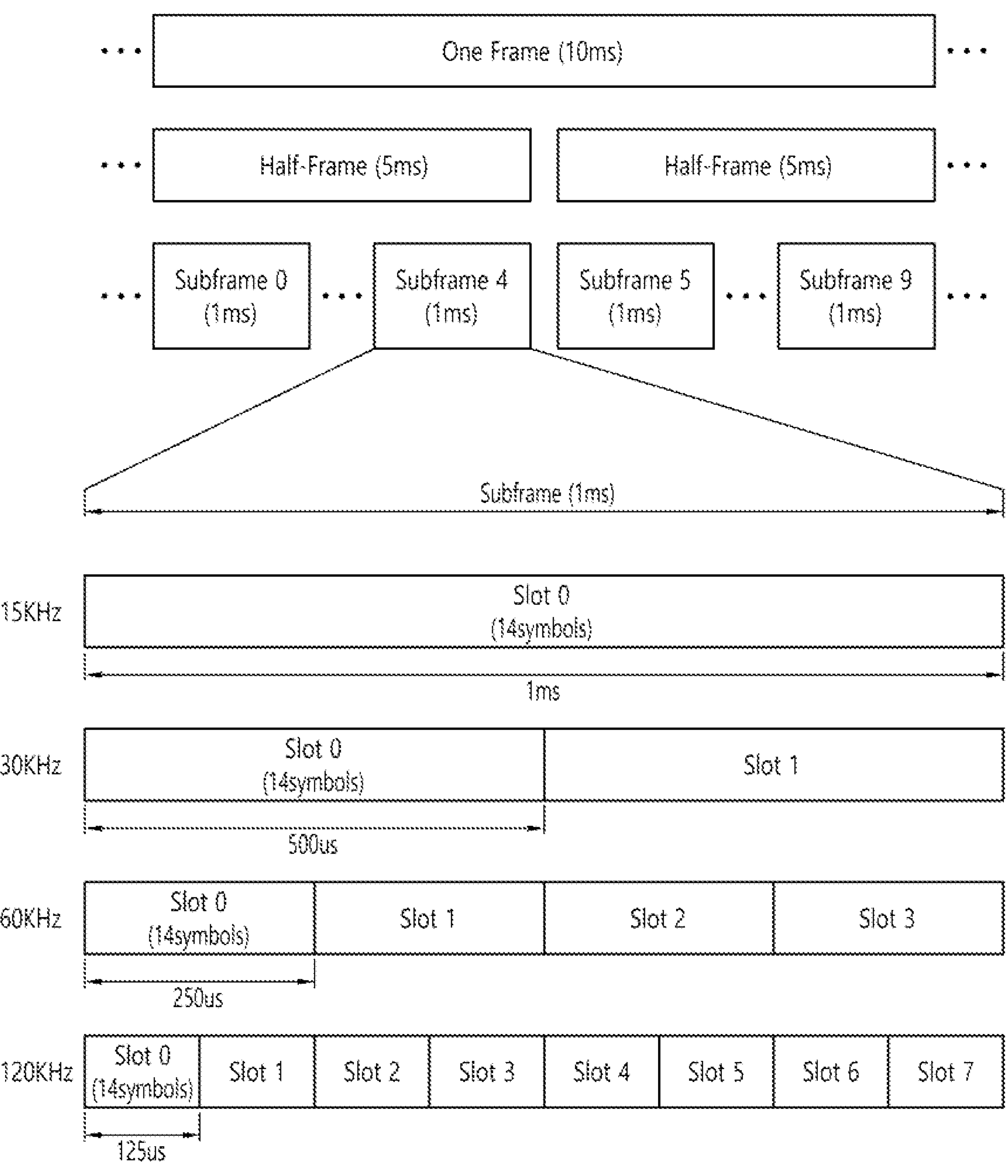
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a “sub 6 GHz range”, and FR2 may mean an “above 6 GHz range” and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 KHz |
| FR2 | 24250 MHz-52600 MHz | 60, 120, 240 KHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHZ, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 KHz |
| FR2 | 24250 MHz-52600 MHz | 60, 120, 240 KHz |

Figure 4:
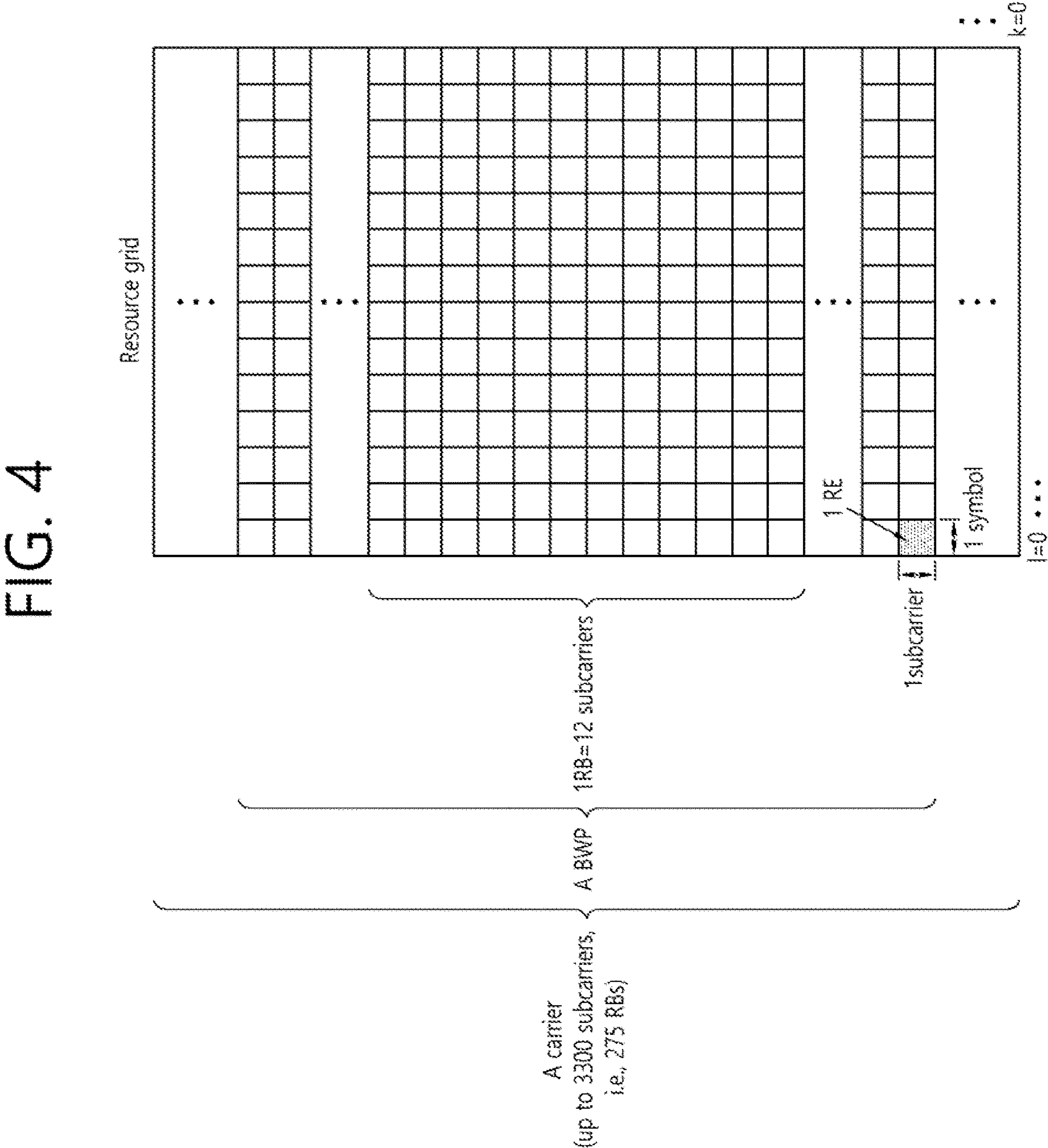
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
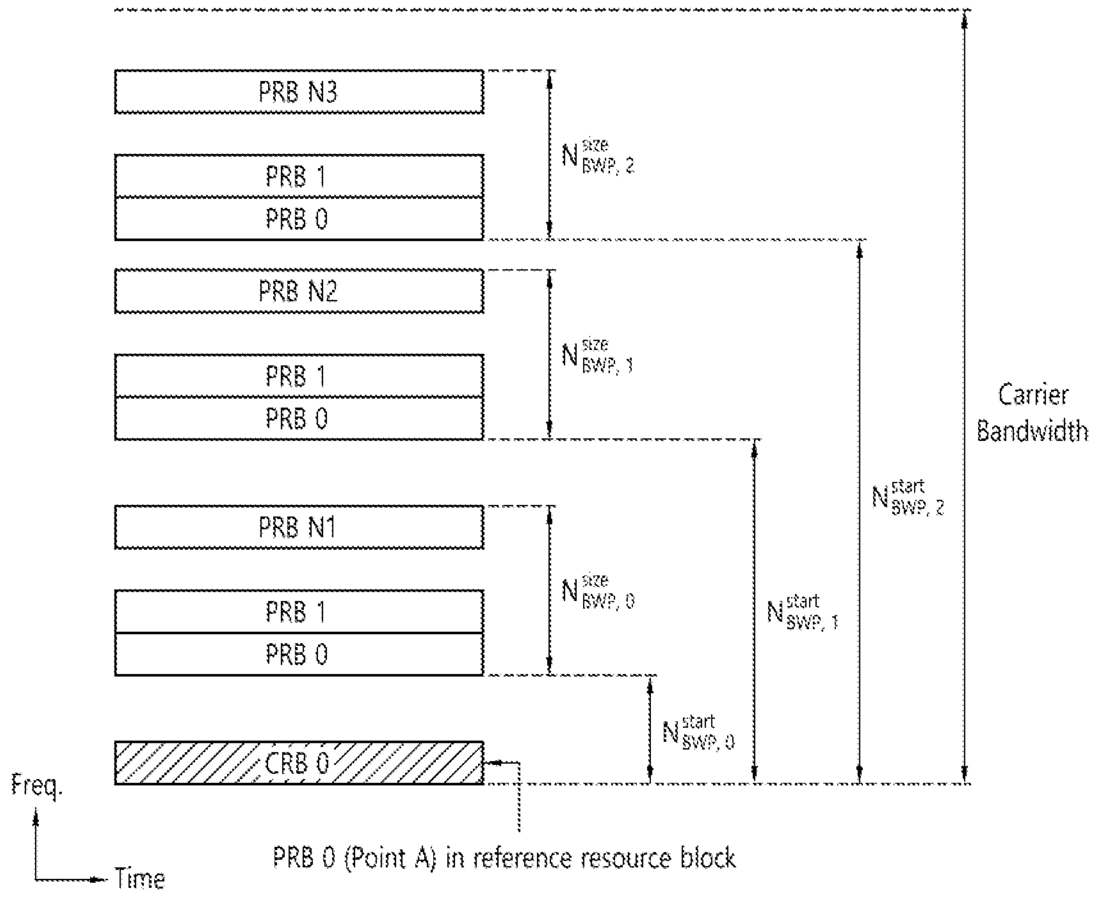
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
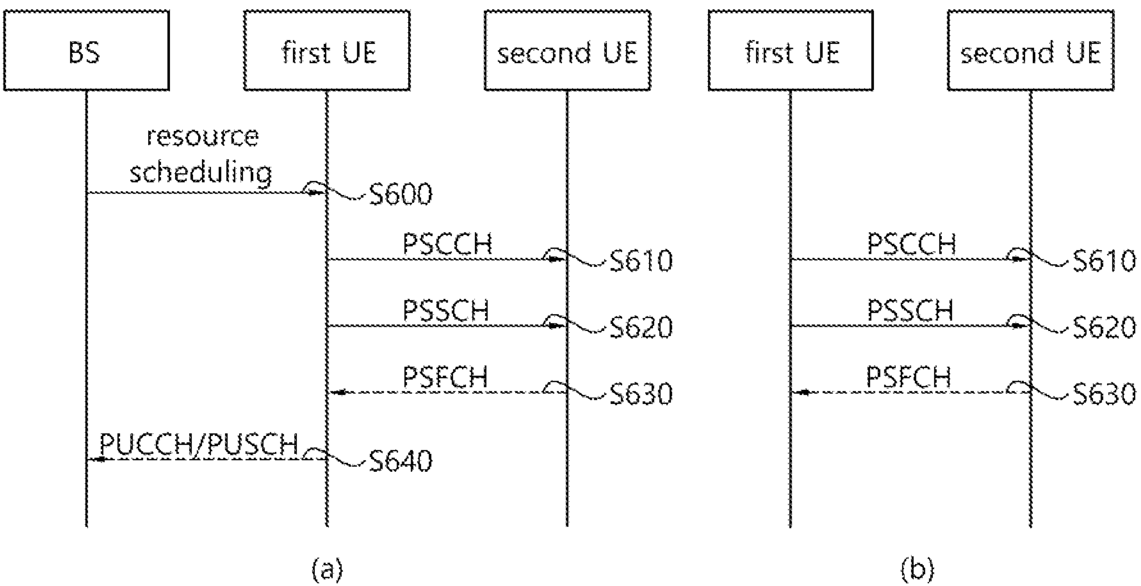
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

- Resource pool index—ceiling ($\log_2$ I) bits, where I is the number of resource pools for transmission configured by the higher layer parameter sl-TxPoolScheduling.
- Time gap—3 bits determined by higher layer parameter sl-DCI-ToSL-Trans
- HARQ process number—4 bits
- New data indicator—1 bit
- Lowest index of the subchannel allocation to the initial transmission—ceiling ($\log_2(N^{SL}_{subChannel})$) bits
- SCI format 1-A fields: frequency resource assignment, time resource assignment
- PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH.
- PUCCH resource indicator—3 bits
- Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.
- Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static
- Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and $2^{nd}$-stage-SCI on PSSCH. The following information is transmitted by means of the SCI format 1-A:

- Priority—3 bits
- Frequency resource assignment—ceiling ($\log_2(N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3
- Time resource assignment—5 bits when the value of the higher layer parameter sl-MaxNumPerReserve is configured to 2; otherwise 9 bits when the value of the higher layer parameter sl-MaxNumPerReserve is configured to 3
- Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0) bit otherwise
- DMRS pattern—ceiling ($\log_2 N_{pattern}$) bits, where $N_{pattern}$ is the number of DMRS patterns configured by higher layer parameter sl-PSSCH-DMRS-TimePatternList
- $2^{nd}$-stage SCI format—2 bits as defined in Table 5
- Beta_offset indicator—2 bits as provided by higher layer parameter sl-BetaOffsets2ndSCI
- Number of DMRS port—1 bit as defined in Table 6
- Modulation and coding scheme—5 bits
- Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise
- PSFCH overhead indication—1 bit if higher layer parameter sl-PSFCH-Period=2 or 4; 0 bit otherwise
- Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
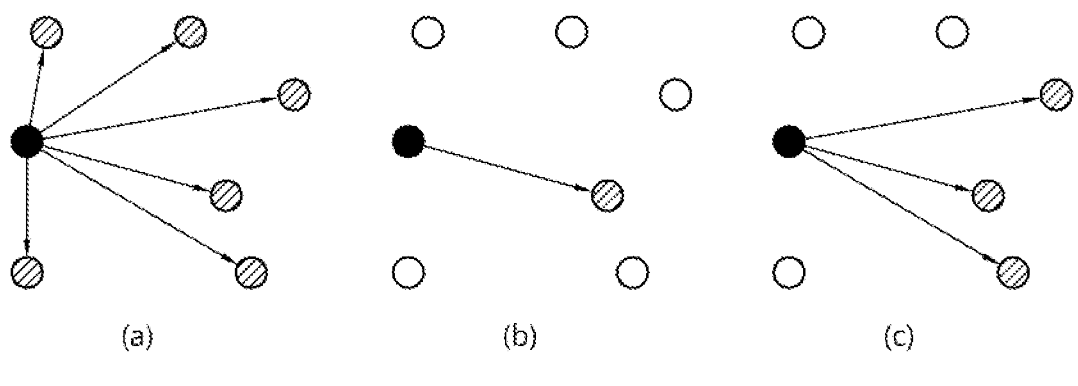
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure. SL groupcast communication may be replaced with SL multicast communication. SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure. HARQ-ACK may be referred to as ACK. ACK information, or positive-ACK information, and HARQ-NACK may be referred to as NACK, NACK information, or negative-ACK information.

Hereinafter, UE procedure for reporting HARQ-ACK on sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ $(0 \leq k < T'_{max})$ has a PSFCH transmission occasion resource if k mod $N^{PSFCH}_{PSSCH}=0$, where $t'^{SL}$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j \cdot N^{PSFCH}_{PSSCH}) \cdot M^{PSFCH}_{subch\ slot}, (i+1+j \cdot N^{PSFCH}_{PSSCH}) \cdot M^{PSFCH}_{subch,slot}-1]$ PRBs from the $M^{PRB,set}_{PSFCH}$ PRBs to slot i among the PSSCH slots associated with the PSFCH slot and sub-channel j, where $M^{PSFCH}_{subch,slot}=M^{PSFCH}_{PRB,set}/(N_{subch} \cdot N^{PSFCH}_{PSSCH})$, $0 \leq i < N^{PSFCH}_{PSSCH}$, $0 \leq j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers,

- $N^{PSFCH}_{type}=1$ and the $M^{PSFCH}_{subch,slot}$ PRBs are associated with the starting sub-channel of the corresponding PSSCH
- $N^{PSFCH}_{type}=N^{PSSCH}_{subch}$ and the $N^{PSSCH}_{subch} \cdot M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSSCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID}) \bmod R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Meanwhile, in NR V2X of release 16, power saving operation of a UE was not supported. On the other hand, from NR V2X of release 17, the power saving operation of a UE (e.g., Power Saving UE) will be supported.

Meanwhile, for the power saving operation of the UE (e.g., SL DRX operation, a SL DRX configuration (e.g., a SL DRX cycle, SL DRX on-duration, SL DRX off-duration, a timer to support the SL DRX operation (e.g., SL DRX inactivity timer, SL DRX HARQ RTT timer. SL DRX retransmission timer), etc.) to be used by the power saving UE (P-UE) should be defined. In addition, in on-duration (e.g., duration in which sidelink reception/transmission can be performed) and/or off-duration (e.g., duration operating in a sleep mode), operation of a transmitting (TX) UE and a receiving (RX) UE should be defined.

In addition. SL DRX operation of the RX UE (e.g., SL DRX timer operation) may be applied differently depending on resource selection/reservation operation of the TX UE.

Meanwhile, when the RX UE performs SL DRX operation, the TX UE may determine that retransmission or other initial transmission to the RX UE is required. In this case, the TX UE may need to indicate the RX UE that is the subject of the retransmission or other initial transmission to extend or maintain an active time.

Figure 8:
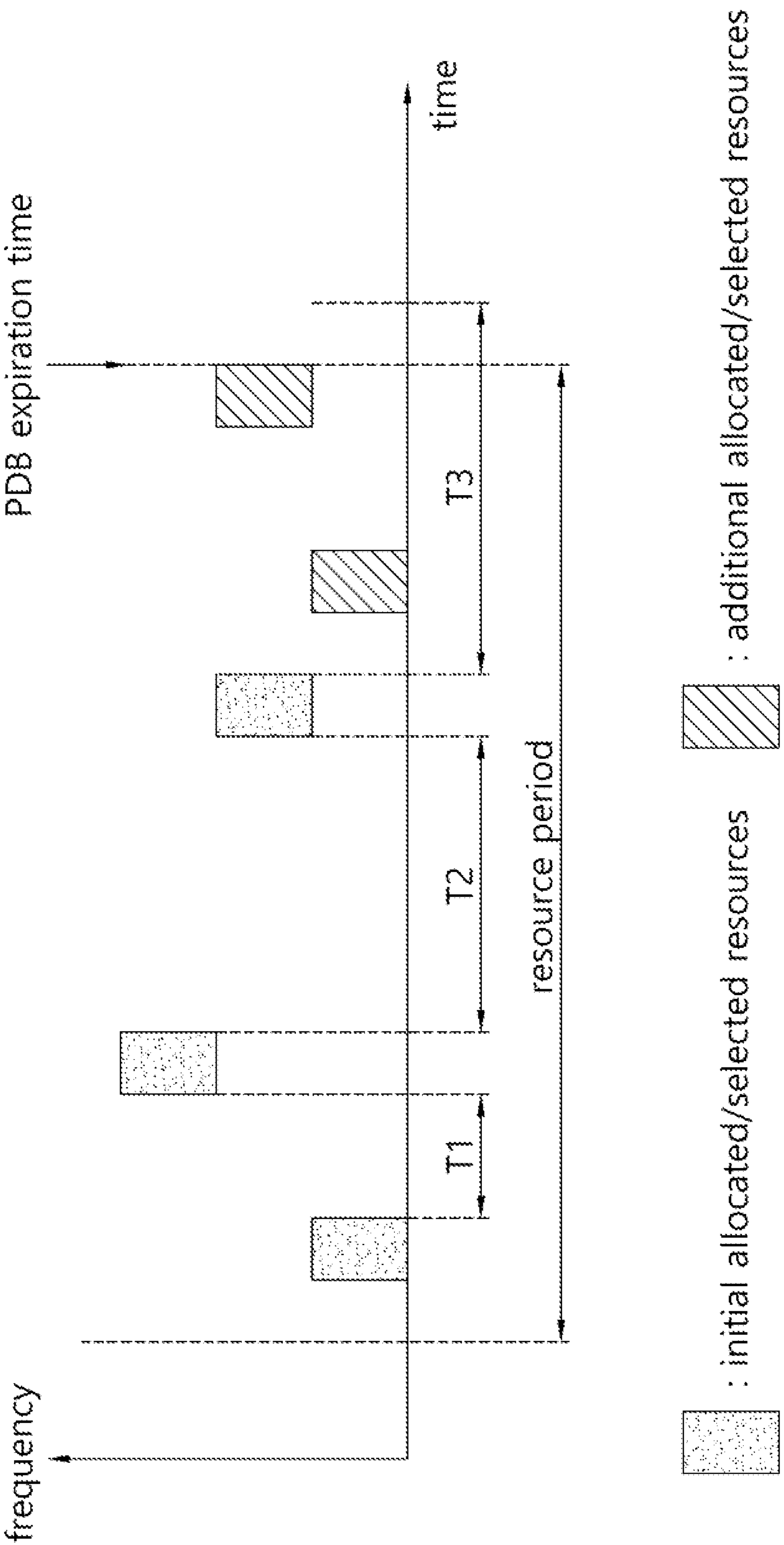
FIG. 8 shows an example of a failure of transmission of a TX UE due to an RX UE performing SL DRX operation not extending or maintaining an active time.

FIG. 8 shows an example of a failure of transmission of a TX UE due to an RX UE performing SL DRX operation not extending or maintaining an active time. The embodiment of FIG. 8 may be combined with various embodiments of the present disclosure.

Referring to FIG. 8, three resources may be initially selected/allocated for SL transmission within a resource period. For example, the three resources may be resources allocated by a base station. For example, the three resources may be resources selected by the TX UE. In other words, the three resources within the resource period may be resources allocated/determined based on the resource allocation mode 1 or the resource allocation mode 2. In this case, the TX UE may perform SL transmission based on the initially allocated/selected resources, and the RX UE may not monitor a PSCCH related to the corresponding SL HARQ process from the TX UE during T1, T2 and T3 based on resource allocation information (e.g., time resource indicator value (TRIV)) included in SCI. Meanwhile, the TX UE may determine that it is necessary to perform additional retransmission within a packet delay budget (PDB) expiration time. In this case, the TX UE may be allocated additional resource(s) by the base station before the PDB expiration time, or the TX UE may select additional resource(s) before the PDB expiration time. Thereafter, the TX UE may perform SL transmission to the RX UE based on the additional allocated/selected resource(s). However, as shown in the embodiment of FIG. 8, since the RX UE does not perform PSCCH monitoring during T3, SL transmission by the TX UE may finally fail. From the perspective of the TX UE, the SL transmission performed during T3 may cause waste of radio resources and may cause unnecessary interference to other UEs. From the perspective of the RX UE, skipping monitoring during T3 may benefit from saving battery consumption, but may result in missed opportunities to receive packets transmitted by the TX UE within the PDB.

Based on various embodiments of the present disclosure, a method of SL DRX operation of an RX UE (or a TX UE) based on resource (re)selection/reservation operation of the TX UE and an apparatus supporting the same are proposed.

Figure 9:
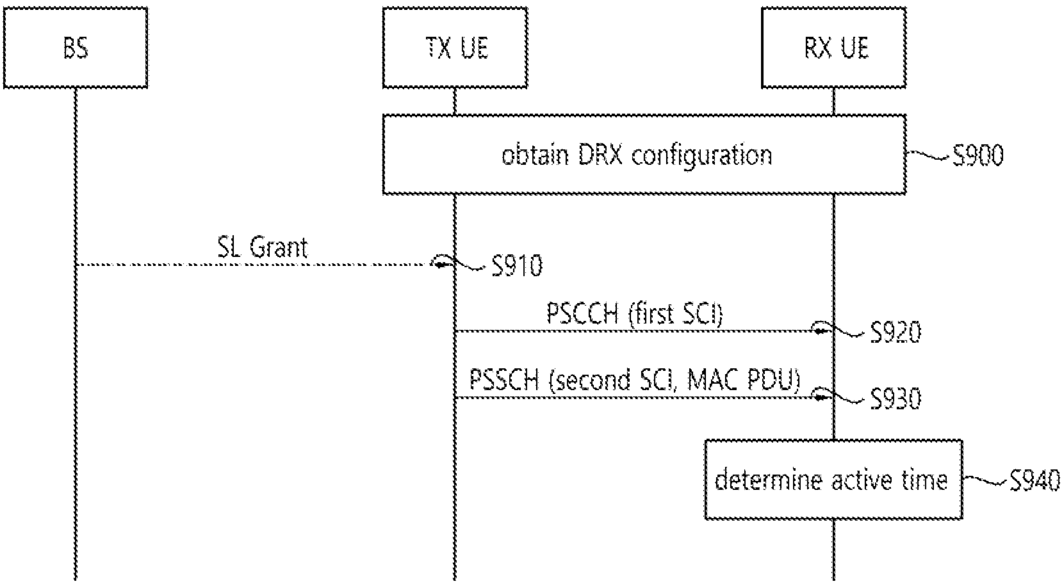
FIG. 9 shows a procedure for an RX UE to maintain or extend an active time based on information related to an active state, based on an embodiment of the present disclosure.

FIG. 9 shows a procedure for an RX UE to maintain or extend an active time based on information related to an active state, based on an embodiment of the present disclosure. The embodiment of FIG. 9 may be combined with various embodiments of the present disclosure.

Referring to FIG. 9, in step S900, the TX UE and/or the RX UE may obtain a DRX configuration. For example, the DRX configuration may include a Uu DRX configuration and/or a SL DRX configuration. For example, the TX UE and/or the RX UE may receive the DRX configuration from a base station. For example, the DRX configuration may be configured or pre-configured for the TX UE and/or the RX UE. For example, if the TX UE receives the DRX configuration from the base station, the TX UE may transmit the DRX configuration to the RX UE. For example, if the TX UE determines the DRX configuration, the TX UE may transmit the DRX configuration to the RX UE.

For example, the Uu DRX configuration may include information related to a drx-HARQ-RTT-TimerSL timer and/or information related to a drx-RetransmissionTimerSL timer. For example, the timer may be used for the following purposes.

(1) drx-HARQ-RTT-TimerSL timer: the duration in which a TX UE (UE supporting Uu DRX operation) performing sidelink communication based on sidelink resource allocation mode 1 does not perform PDCCH (or DCI) monitoring for sidelink mode 1 resource allocation from a base station For example, the drx-HARQ-RTT-TimerSL may be operated per SL HARQ process. For example, the drx-HARQ-RTT-TimerSL may be the minimum duration before a SL retransmission grant is expected by the MAC entity.

(2) drx-RetransmissionTimerSL timer: the duration in which a TX UE (UE supporting Uu DRX operation) performing sidelink communication based on sidelink resource allocation mode 1 performs PDCCH (or DCI) monitoring for sidelink mode 1 resource allocation from a base station For example, the drx-RetransmissionTimerSL may be operated per SL HARQ process. For example, the drx-RetransmissionTimerSL may be the maximum duration until a grant for SL retransmission is received.

The SL DRX configuration mentioned in the present disclosure may include at least one or more of the following parameters/information.

(1) SL drx-onDurationTimer: the duration at the beginning of a SL DRX Cycle (2) SL drx-SlotOffset: the delay before starting the sl drx-onDuration Timer (3) SL drx-Inactivity Timer: the duration after the PSCCH occasion in which a PSCCH indicates a new SL transmission for the MAC entity (4) SL drx-RetransmissionTimer (per sidelink process or per HARQ process): the maximum duration until a retransmission is received (5) SL drx-HARQ-RTT-Timer (per sidelink process or per HARQ process): the minimum duration before PSCCH (sidelink control information) & PSSCH for SL HARQ retransmission is expected by the MAC entity (6) SL drx-LongCycleStartOffset: the Long DRX cycle and drx-StartOffset which defines the subframe where the Long and Short DRX Cycle starts (7) SL drx-ShortCycle (optional): the Short DRX cycle (8) SL drx-ShortCycleTimer (optional): the duration the UE shall follow the Short DRX cycle (9) SL drx-HARQ-RTT-Timer (per sidelink process): the minimum duration before an assignment for HARQ retransmission is expected by the MAC entity

(10) SL drx-StartOffset: the subframe where the SL DRX cycle starts

(11) SL drx-Cycle: SL DRX cycle

The following SL DRX timer mentioned in the present disclosure may be used for the following purposes.

(1) SL DRX on-duration timer: the duration in which a UE performing the SL DRX operation should basically operate in an active time for PSCCH/PSSCH reception of a counterpart UE (2) SL DRX inactivity timer: the duration in which a UE performing the SL DRX operation extends the SL DRX on-duration period, which is the duration in which the UE should basically operate in an active time for PSCCH/PSSCH reception of a counterpart UE For example, the UE may extend the SL DRX on-duration timer by the SL DRX inactivity timer duration. Also, if the UE receives a new packet (e.g., new PSSCH transmission) from the counterpart UE, the UE may extend the SL DRX on-duration timer by starting the SL DRX inactivity timer.

For example, the SL DRX inactivity timer may be used to extend the duration of the SL DRX on-duration timer, which is the duration in which the RX UE performing the SL DRX operation should basically operate in an active time for PSCCH/PSSCH reception of a counterpart TX UE. That is, the SL DRX on-duration timer may be extended by the duration of the SL DRX inactivity timer. In addition, if the RX UE receives a new packet (e.g., new PSSCH transmission) from the counterpart TX UE, the RX UE may extend the SL DRX on-duration timer by starting the SL DRX inactivity timer.

(3) SL DRX HARQ RTT Timer: the duration in which a UE performing the SL DRX operation operates in a sleep mode until the UE receives a retransmission packet (or PSSCH assignment) transmitted by a counterpart UE For example, if the UE starts the SL DRX HARQ RTT timer, the UE may determine that the counterpart UE will not transmit a sidelink retransmission packet to the UE until the SL DRX HARQ RTT timer expires, and the UE may operate in a sleep mode while the corresponding timer is running. For example, if the UE starts the SL DRX HARQ RTT timer, the UE may not monitor the sidelink retransmission packet from the counterpart UE until the SL DRX HARQ RTT timer expires. For example, if the RX UE which has received a PSCCH/PSSCH transmitted by the TX UE transmits SL HARQ NACK feedback, the RX UE may start the SL DRX HARQ RTT timer. In this case, the RX UE may determine that the counterpart TX UE will not transmit a sidelink retransmission packet to the RX UE until the SL DRX HARQ RTT timer expires, and the RX UE may operate in a sleep mode while the corresponding timer is running.

(4) SL DRX retransmission timer: the timer which starts when the SL DRX HARQ RTT timer expires, and the duration in which a UE performing the SL DRX operation operates in an active time to receive a retransmission packet (or PSSCH assignment) transmitted by a counterpart UE For example, during the corresponding timer duration, the UE may receive or monitor the retransmission sidelink packet (or PSSCH assignment) transmitted by the counterpart UE. For example, the RX UE may receive or monitor a retransmission sidelink packet (or PSSCH assignment) transmitted by the counterpart TX UE while the SL DRX retransmission timer is running.

In the present disclosure, the names of timers (Uu DRX HARQ RTT TimerSL, Uu DRX Retransmission TimerSL, Sidelink DRX Onduration Timer. Sidelink DRX Inactivity Timer, Sidelink DRX HARQ RTT Timer, Sidelink DRX Retransmission Timer, etc.) are exemplary, and a timer performing the same/similar function based on the description of each timer may be regarded as the same/similar timer regardless of its name.

The timer operation described in the present disclosure is generally applicable to all of the following SL DRX timer operation.

A SL DRX timer: A timer that causes the UE to operate in active time while the timer is running (e.g., a SL DRX on-duration timer, a SL DRX inactivity timer, a SL DRX retransmission timer, or a SL DRX active time related timer)

In step S910, the TX UE may receive a SL grant from the base station. For example, the SL grant may be a SL dynamic grant (DG) or a SL configured grant (CG). For example, the SL CG may be a SL CG type 1 or a SL CG type 2. For example, based on the SL grant, at least one SL resource may be allocated to the TX UE. Alternatively, the TX UE may reserve/select at least one SL resource based on sensing.

In step S920, the TX UE may transmit, through a PSCCH, first SCI for scheduling of second SCI and a PSSCH to the RX UE based on a first SL resource.

In step S930, the TX UE may transmit, through the PSSCH, the second SCI and a MAC PDU to the RX UE based on the first SL resource.

For example, based on that the first SL resource is the last SL resource among the at least one SL resource within a period, information related to an active state may be included in the first SCI or the second SCI. For example, based on that the first SL resource is not the last SL resource among the at least one SL resource within a period, information related to an active state may not be included in the first SCI or the second SCI.

In step S940, the RX UE may determine an active time based on the information related to the active state. In addition, the RX UE may perform PSCCH monitoring from the TX UE within the active time.

Based on an embodiment of the present disclosure, if the TX UE fails to use all of SL CG resources allocated by the base station (e.g., if the TX UE transmits SL data from the second resource among SL CG resources (e.g., three resources) within one period and thus fails to use all of three SL CG resources, i.e., if the TX UE uses only two CG resources, starting from the second resource), and if a SL HARQ feedback mode is set to HARQ feedback disabled (i.e., HARQ Feedback Disabled MAC PDU transmission), and if sl-CG-MaxTransNumList is not configured, the UE may request sidelink retransmission resource(s) by transmitting NACK through a PUCCH to the base station autonomously. In this case (if the TX UE fails to use all of SL CG resources allocated by the base station (e.g., if the TX UE transmits SL data from the second resource among SL CG resources (e.g., three resources) within one period and thus fails to use all of three SL CG resources, i.e., if the TX UE uses only two CG resources, starting from the second resource), and if a SL HARQ feedback mode is set to HARQ feedback disabled (i.e., HARQ Feedback Disabled MAC PDU transmission), and if sl-CG-MaxTransNumList is not configured, and if the UE requests sidelink retransmission resource(s) by transmitting NACK through a PUCCH to the base station autonomously) the TX UE may transmit "retransmission request indication (e.g., an indication that causes the RX UE to operate in an active state and monitor retransmission data since retransmission resources have been requested from the base station)" to the RX UE through SCI. Through this, the TX UE may cause the RX UE to start a SL DRX HARQ RTT timer and a SL DRX retransmission timer (if the SL DRX HARQ RTT timer expires) and receive retransmission data transmitted by the TX UE. If SCI received by the RX UE does not include "retransmission request indication (e.g., an indication that causes the RX UE to operate in an active state and monitor retransmission data since retransmission resources have been requested from the base station)", or if the RX UE receives "retransmission request indication (e.g., an indication that causes the RX UE to operate in a sleep state and perform power saving operation since retransmission resources have not been requested from the base station)", the RX UE may operate in a sleep mode or may not perform monitoring operation for a PSCCH/PSSCH transmitted by the TX UE. In the present disclosure, sl-CG-MaxTransNumList may include at least one sl-CG-MaxTransNum, and sl-CG-Max TransNum may indicate a maximum number of transmissions related to CG resources.

Based on an embodiment of the present disclosure, the TX UE may perform SL data transmission using SL CG resources allocated by the base station. In this case, if there are three CG resources within one period, and if sl-CG-Max TransNum set in sl-CG-Max TransNumList is configured to be 2, and if the TX UE transmits SL data using two CG resources, and if the number of transmissions of the TX UE reaches sl-CG-MaxTransNum, the TX UE may transmit "retransmission request indication (e.g., an indication that causes the RX UE to operate in a sleep state and perform power saving operation since retransmission resources have not been requested from the base station)" to the RX UE. Through this, the TX UE may cause the RX UE to operate in a sleep mode or not to perform monitoring operation for a PSCCH/PSSCH transmitted by the TX UE. Alternatively, the TX UE may not transmit "retransmission request indication" to the RX UE. Through this, the TX UE may cause the RX UE to operate in a sleep mode or not to perform monitoring operation for a PSCCH/PSSCH transmitted by the TX UE.

In addition, the TX UE may perform SL data transmission using SL CG resources allocated from the base station. In this case, if there are three CG resources within one period, and if sl-CG-Max TransNum set in sl-CG-Max TransNumList is configured to be 3, and if the TX UE transmits SL data using three CG resources, and if the number of transmissions of the TX UE reaches sl-CG-MaxTransNum, the TX UE may transmit "retransmission request indication (e.g., an indication that causes the RX UE to operate in a sleep state and perform power saving operation since retransmission resources have not been requested from the base station)" to the RX UE. Through this, the TX UE may cause the RX UE to operate in a sleep mode or not to perform monitoring operation for a PSCCH/PSSCH transmitted by the TX UE. Alternatively, the TX UE may not transmit "retransmission request indication" to the RX UE. Through this, the TX UE may cause the RX UE to operate in a sleep mode or not to perform monitoring operation for a PSCCH/PSSCH transmitted by the TX UE.

For example, if the operation in Table 11 is satisfied, the TX UE may transmit "retransmission request indication (e.g., an indication that causes the RX UE to operate in a sleep state and perform power saving operation since retransmission resources have not been requested from the base station)" to the RX UE. Through this, the TX UE may cause the RX UE to operate in a sleep mode or not to perform monitoring operation for a PSCCH/PSSCH transmitted by the TX UE. Alternatively, the TX UE may not transmit "retransmission request indication" to the RX UE. Through this, the TX UE may cause the RX UE to operate in a sleep mode or not to perform monitoring operation for a PSCCH/PSSCH transmitted by the TX UE.

TABLE 11

| When FB is disabled, for CG, if sl-CG-MaxTransNumList is configured with a value not larger than the number of CG resources, when sl-CG-Max TransNum is reached, UE assumes that next retransmission(s) of the MAC PDU is not required |
|---|

Based on an embodiment of the present disclosure, if the TX UE satisfies the following three conditions, SL DRX operation is proposed.

If SL HARQ Feedback Disabled MAC PDU is transmitted, and

If sl-CG-Max TransNumList is configured and sl-CG-MaxTransNum is configured to be a value less than the number of SL CG resources (e.g., sl-CG-MaxTransNum is configured to be a number less than the number of CG resources within one period (e.g., 3)), and If the TX UE transmits SL data using CG resources, and the number of transmissions does not reach sl-CG-MaxTransNum If the above three conditions are satisfied, it may be interpreted as a condition that retransmission is required. Alternatively, if the above three conditions are satisfied, the TX UE may transmit NACK through a PUCCH. In this case, the base station may allocate retransmission resource(s) to the UE.

This may be the case in which NACK is transmitted to the base station through the PUCCH even if the TX UE completes transmission without using all of the allocated CG resources (i.e., even if the TX UE does not need retransmission). Thus, the base station may allocate unnecessary retransmission resource(s). In the present disclosure, even if the TX UE transmits NACK through the PUCCH and is allocated retransmission resource(s) from the base station due to satisfying the above three conditions, the TX UE may transmit "retransmission request indication (e.g., an indication that causes the RX UE to operate in a sleep state and perform power saving operation since retransmission resources have not been requested from the base station)" to the RX UE. Through this, the TX UE may cause the RX UE to operate in a sleep mode or not to perform monitoring operation for a PSCCH/PSSCH transmitted by the TX UE. Alternatively, the TX UE may not transmit "retransmission request indication" to the RX UE. Through this, the TX UE may cause the RX UE to operate in a sleep mode or not to perform monitoring operation for a PSCCH/PSSCH transmitted by the TX UE. Furthermore, the TX UE may ignore and discard the retransmission grant allocated from the base station, and the TX UE may not perform packet transmission on the corresponding resource.

Based on an embodiment of the present disclosure, if the TX UE satisfies the above three conditions (e.g., if there are three SL CG resources, and if sl-CG-MaxTransNum is configured to be 3 or 2), and if the TX UE completes SL data transmission using only two CG resources or one CG resource actually, the TX UE may transmit NACK through a PUCCH and receive retransmission resource assignment from the base station. In this case, the TX UE does not need to actually perform retransmission, but since it has been allocated retransmission resource(s) from the base station, the TX UE may retransmit retransmission data using the corresponding resource(s). Therefore, the TX UE may transmit "retransmission request indication (e.g., an indication that causes the RX UE to operate in an active state and monitor retransmission data since retransmission resources have been requested from the base station)" to the RX UE through SCI. Through this, the TX UE may cause the RX UE to start a SL DRX HARQ RTT timer and a SL DRX retransmission timer (if the SL DRX HARQ RTT timer expires) and receive retransmission data transmitted by the TX UE.

Based on an embodiment of the present disclosure, if the TX UE transmits NACK to the base station through a PUCCH or if a PUCCH is not configured, the TX UE may determine that additional resources are required even though the TX UE has not exhausted its allocated mode 1 resources. For example, if the TX UE transmits NACK to the base station through a PUCCH or if a PUCCH is not configured, and if the TX UE uses only two CG resources among three CG resources due to variation in traffic generation time, and if the number of transmissions required by the TX UE to actually transmit a MAC PDU is three, the TX UE may determine that additional resources are required. For example, if the TX UE transmits NACK to the base station through a PUCCH or if a PUCCH is not configured, and if the TX UE uses only two DG resources among three DG resources due to variation in traffic generation time, and if the number of transmissions required by the TX UE to actually transmit a MAC PDU is three, the TX UE may determine that additional resources are required. In the above case, the TX UE may transmit "retransmission request indication (e.g., an indication that causes the RX UE to operate in an active state and monitor retransmission data since retransmission resources have been requested from the base station)" to the RX UE through SCI. Through this, the TX UE may cause the RX UE to start a SL DRX HARQ RTT timer and a SL DRX retransmission timer (if the SL DRX HARQ RTT timer expires) and receive retransmission data transmitted by the TX UE. For example, alternatively, if mode 1 resources with no PUCCH is configured, the TX UE may always transmit "retransmission request indication (e.g., an indication that causes the RX UE to operate in an active state and monitor retransmission data since retransmission resources have been requested from the base station)" to the RX UE through SCI. Through this, the TX UE may cause the RX UE to start a SL DRX HARQ RTT timer and a SL DRX retransmission timer (if the SL DRX HARQ RTT timer expires) and receive retransmission data transmitted by the TX UE.

For the above operation proposed in the present disclosure, when reaching a SL CG period from which the same SL HARQ process ID is derived, the TX UE may transmit "retransmission request indication (e.g., an indication that causes the RX UE to operate in a sleep state and perform power saving operation since retransmission resources have not been requested from the base station)" to the RX UE. Through this, the TX UE may cause the RX UE to operate in a sleep mode or not to perform monitoring operation for a PSCCH/PSSCH transmitted by the TX UE. Alternatively, the TX UE may not transmit "retransmission request indication" to the RX UE. Through this, the TX UE may cause the RX UE to operate in a sleep mode or not to perform monitoring operation for a PSCCH/PSSCH transmitted by the TX UE. Furthermore, the TX UE may ignore and discard the retransmission grant allocated from the base station, and the TX UE may not perform packet transmission on the corresponding resource.

Furthermore, in the case of counting the number of transmissions required to transmit a MAC PDU applicable to the above proposed operation (or proposals), only the number of actual sidelink transmissions may be counted. Alternatively, in the case of counting the number of transmissions required to transmit a MAC PDU applicable to the above proposed operation (or proposals), sidelink transmissions dropped due to prioritization, etc. may also be counted.

The proposals in the present disclosure may also be extended/applied to SL HARQ Enabled MAC PDU transmission. The proposals in the present disclosure may also be extended/applied to SL DG based operation. The proposals in the present disclosure may also be extended/applied to operation based on the resource allocation mode 1 or the resource allocation mode 2.

The proposal of the present disclosure can be applied/extended to a method of solving a problem in which loss occurs due to interruption which occurs during Uu BWP switching. In addition, in the case of a plurality of SL BWPs being supported for the UE, the proposal of the present disclosure can be applied/extended to a method of solving a problem in which loss occurs due to interruption which occurs during SL BWP switching.

The proposal of the present disclosure can be applied/extended to UE-pair specific SL DRX configuration(s), UE-pair specific SL DRX pattern(s) or parameter(s) (e.g., timer) included in UE-pair specific SL DRX configuration(s), as well as default/common SL DRX configuration(s), default/common SL DRX pattern(s), or parameter(s) (e.g., timer) included in default/common SL DRX configuration(s). In addition, the on-duration mentioned in the proposal of the present disclosure may be extended to or interpreted as an active time (e.g., time to wake-up state (e.g., RF module turned on) to receive/transmit radio signal(s)) duration, and the off-duration may be extended to or interpreted as a sleep time (e.g., time to sleep in sleep mode state (e.g., RF module turned off) to save power) duration. It does not mean that the TX UE is obligated to operate in the sleep mode in the sleep time duration. If necessary, the TX UE may be allowed to operate in an active time for a while for a sensing operation and/or a transmission operation, even if it is a sleep time.

For example, whether or not the (some) proposed method/rule of the present disclosure is applied and/or related parameter(s) (e.g., threshold value(s)) may be configured (differently or independently) for each resource pool. For example, whether or not the (some) proposed method/rule of the present disclosure is applied and/or related parameter(s) (e.g., threshold value(s)) may be configured (differently or independently) for each congestion level. For example, whether or not the (some) proposed method/rule of the present disclosure is applied and/or related parameter(s) (e.g., threshold value(s)) may be configured (differently or independently) for each service priority. For example, whether or not the (some) proposed method/rule of the present disclosure is applied and/or related parameter(s) (e.g., threshold value(s)) may be configured (differently or independently) for each service type. For example, whether or not the (some) proposed method/rule of the present disclosure is applied and/or related parameter(s) (e.g., threshold value(s)) may be configured (differently or independently) for each resource pool. For example, whether or not the (some) proposed method/rule of the present disclosure is applied and/or related parameter(s) (e.g., threshold value(s)) may be configured (differently or independently) for each QoS requirement (e.g., latency, reliability). For example, whether or not the (some) proposed method/rule of the present disclosure is applied and/or related parameter(s) (e.g., threshold value(s)) may be configured (differently or independently) for each PQI (5G QoS identifier (5Q1) for PC5). For example, whether or not the (some) proposed method/rule of the present disclosure is applied and/or related parameter(s) (e.g., threshold value(s)) may be configured (differently or independently) for each traffic type (e.g., periodic generation or aperiodic generation). For example, whether or not the (some) proposed method/rule of the present disclosure is applied and/or related parameter(s) (e.g., threshold value(s)) may be configured (differently or independently) for each SL transmission resource allocation mode (e.g., mode 1 or mode 2).

For example, whether or not the proposed rule of the present disclosure is applied and/or related parameter configuration value(s) may be configured (differently or independently) for each resource pool. For example, whether or not the proposed rule of the present disclosure is applied and/or related parameter configuration value(s) may be configured (differently or independently) for each service/packet type. For example, whether or not the proposed rule of the present disclosure is applied and/or related parameter configuration value(s) may be configured (differently or independently) for each service/packet priority. For example, whether or not the proposed rule of the present disclosure is applied and/or related parameter configuration value(s) may be configured (differently or independently) for each QoS requirement (e.g., URLLC/EMBB traffic, reliability, latency). For example, whether or not the proposed rule of the present disclosure is applied and/or related parameter configuration value(s) may be configured (differently or independently) for each PQI. For example, whether or not the proposed rule of the present disclosure is applied and/or related parameter configuration value(s) may be configured (differently or independently) for each cast type (e.g., unicast, groupcast, broadcast). For example, whether or not the proposed rule of the present disclosure is applied and/or related parameter configuration value(s) may be configured (differently or independently) for each (resource pool) congestion level (e.g., CBR). For example, whether or not the proposed rule of the present disclosure is applied and/or related parameter configuration value(s) may be configured (differently or independently) for each SL HARQ feedback option (e.g., NACK-only feedback, ACK/NACK feedback). For example, whether or not the proposed rule of the present disclosure is applied and/or related parameter configuration value(s) may be configured specifically (or differently or independently) for HARQ Feedback Enabled MAC PDU transmission. For example, whether or not the proposed rule of the present disclosure is applied and/or related parameter configuration value(s) may be configured specifically (or differently or independently) for HARQ Feedback Disabled MAC PDU transmission. For example, whether or not the proposed rule of the present disclosure is applied and/or related parameter configuration value(s) may be configured specifically (or differently or independently) according to whether a PUCCH-based SL HARQ feedback reporting operation is configured or not. For example, whether or not the proposed rule of the present disclosure is applied and/or related parameter configuration value(s) may be configured specifically (or differently or independently) for pre-emption or pre-emption-based resource reselection. For example, whether or not the proposed rule of the present disclosure is applied and/or related parameter configuration value(s) may be configured specifically (or differently or independently) for re-evaluation or re-evaluation-based resource reselection. For example, whether or not the proposed rule of the present disclosure is applied and/or related parameter configuration value(s) may be configured (differently or independently) for each (L2 or L1) (source and/or destination) identifier. For example, whether or not the proposed rule of the present disclosure is applied and/or related parameter configuration value(s) may be configured (differently or independently) for each (L2 or L1) (a combination of source ID and destination ID) identifier. For example, whether or not the proposed rule of the present disclosure is applied and/or related parameter configuration value(s) may be configured (differently or independently) for each (L2 or L1) (a combination of a pair of source ID and destination ID and a cast type) identifier. For example, whether or not the proposed rule of the present disclosure is applied and/or related parameter configuration value(s) may be configured (differently or independently) for each direction of a pair of source layer ID and destination layer ID. For example, whether or not the proposed rule of the present disclosure is applied and/or related parameter configuration value(s) may be configured (differently or independently) for each PC5 RRC connection/link. For example, whether or not the proposed rule of the present disclosure is applied and/or related parameter configuration value(s) may be configured specifically (or differently or independently) for the case of performing SL DRX. For example, whether or not the proposed rule of the present disclosure is applied and/or related parameter configuration value(s) may be configured (differently or independently) for each SL mode type (e.g., resource allocation mode 1 or resource allocation mode 2). For example, whether or not the proposed rule of the present disclosure is applied and/or related parameter configuration value(s) may be configured specifically (or differently or independently) for the case of performing (a)periodic resource reservation.

The certain time mentioned in the proposal of the present disclosure may refer to a time during which a UE operates in an active time for a pre-defined time in order to receive sidelink signal(s) or sidelink data from a counterpart UE. The certain time mentioned in the proposal of the present disclosure may refer to a time during which a UE operates in an active time as long as a specific timer (e.g., sidelink DRX retransmission timer, sidelink DRX inactivity timer, or timer to ensure that an RX UE can operate in an active time in a DRX operation of the RX UE) is running in order to receive sidelink signal(s) or sidelink data from a counterpart UE. In addition, the proposal and whether or not the proposal rule of the present disclosure is applied (and/or related parameter configuration value(s)) may also be applied to a mmWave SL operation.

Based on various embodiments of the present disclosure, when the RX UE performs SL DRX operation, the probability of success of retransmission or other initial transmission to the RX UE by the TX UE can be increased. Specifically, for example, the TX UE may increase the probability of success of retransmission or other initial transmission to the RX UE by the TX UE by instructing the RX UE that is the subject of the retransmission or other initial transmission to extend or maintain an active time.

Figure 10:
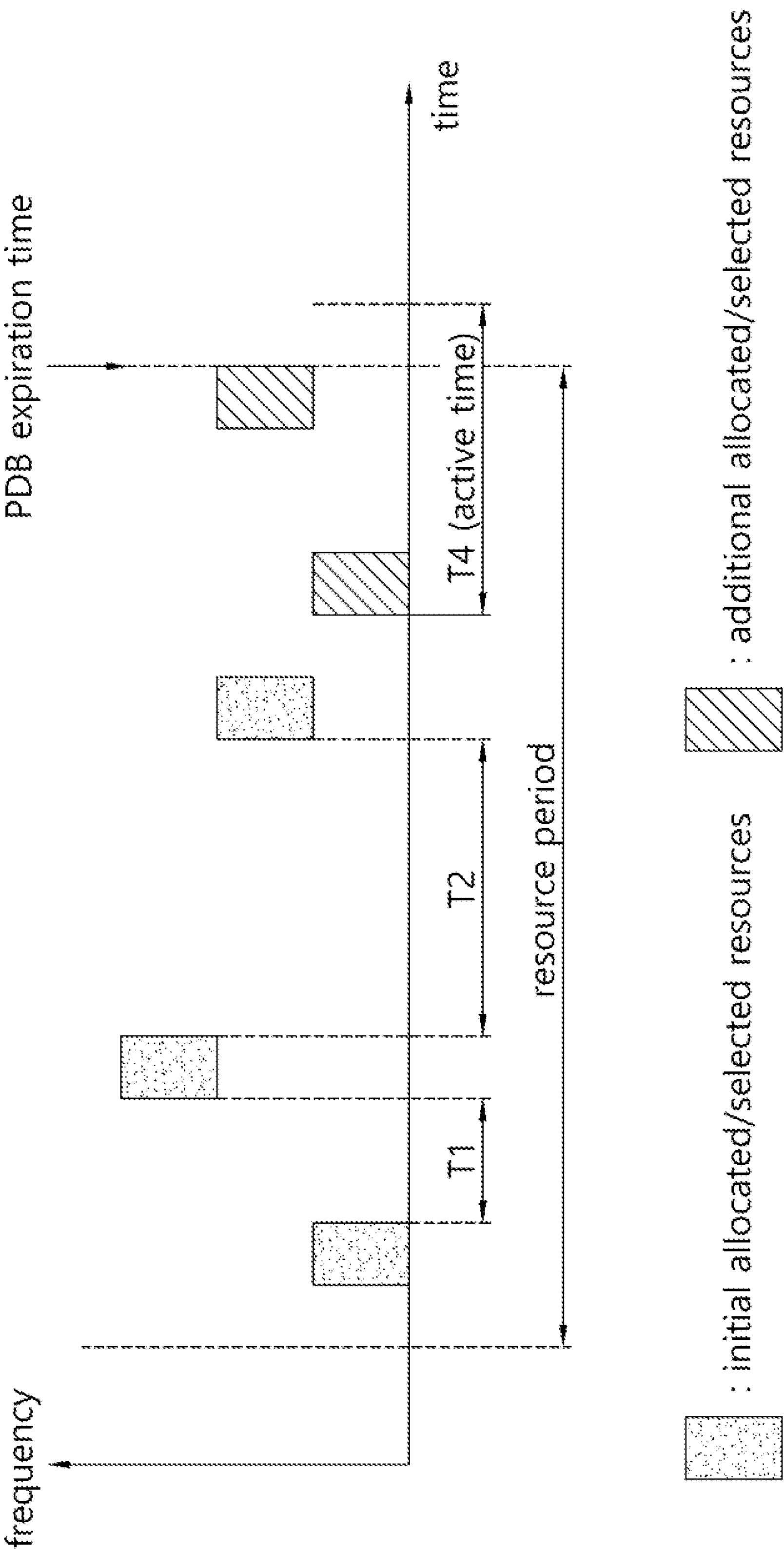
FIG. 10 shows an example where the reliability of SL transmission is ensured by extending or maintaining an active time by an RX UE performing SL DRX operation, based on an embodiment of the present disclosure.

FIG. 10 shows an example where the reliability of SL transmission is ensured by extending or maintaining an active time by an RX UE performing SL DRX operation, based on an embodiment of the present disclosure. The embodiment of FIG. 10 may be combined with various embodiments of the present disclosure.

Referring to FIG. 10, three resources may be initially selected/allocated for SL transmission within a resource period. For example, the three resources may be resources allocated by a base station. For example, the three resources may be resources selected by the TX UE. In other words, the three resources within the resource period may be resources allocated/determined based on the resource allocation mode 1 or the resource allocation mode 2. In this case, the TX UE may perform SL transmission based on the initially allocated/selected resources, and the RX UE may not monitor a PSCCH related to the corresponding SL HARQ process from the TX UE during T1 and T2 based on resource allocation information (e.g., time resource indicator value (TRIV)) included in SCI. Furthermore, the TX UE may transmit information related to an active state through SCI to the RX UE based on the last resource within the period, and the RX UE may operate in an active time during T4. In the embodiment of FIG. 10, the TX UE may determine that it is necessary to perform additional retransmission within a packet delay budget (PDB) expiration time. In this case, the TX UE may be allocated additional resource(s) by the base station before the PDB expiration time, or the TX UE may select additional resource(s) before the PDB expiration time. Thereafter, the TX UE may perform SL transmission to the RX UE based on the additional allocated/selected resource(s). In this case, unlike the embodiment of FIG. 8, SL transmission by the TX UE can finally be successful because the RX UE performs PSCCH monitoring during T4 in the embodiment of FIG. 10. Thus, the probability of success of SL transmission by the TX UE can be increased and unnecessary resource wastage may not occur. The reliability of SL communication can be guaranteed by the RX UE also performing additional PSCCH monitoring after the last resource.

Figure 11:
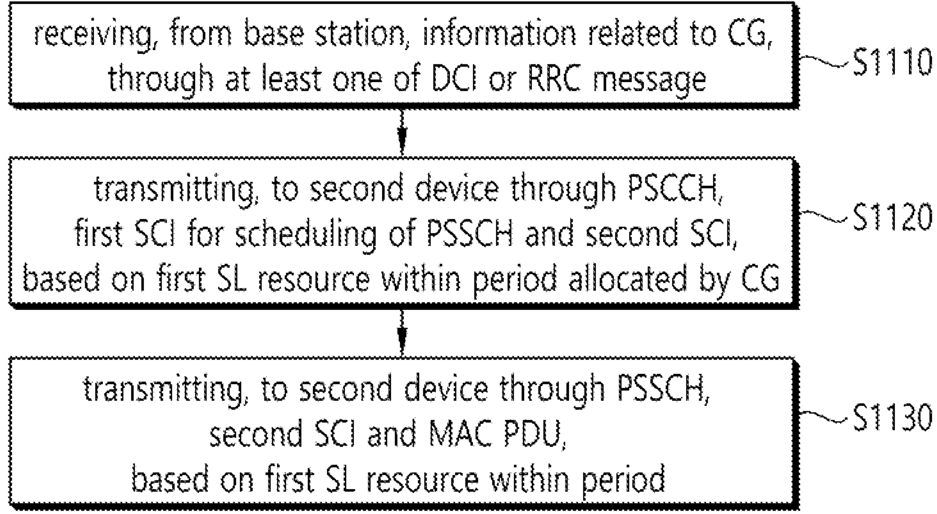
FIG. 11 shows a method for a first device to perform wireless communication, based on an embodiment of the present disclosure.

FIG. 11 shows a method for a first device to perform wireless communication, based on an embodiment of the present disclosure. The embodiment of FIG. 11 may be combined with various embodiments of the present disclosure.

Referring to FIG. 11, in step S1110, the first device may receive, from a base station, information related to a configured grant (CG), through at least one of downlink control information (DCI) or a radio resource control (RRC) message. In step S1120, the first device may transmit, to a second device through a physical sidelink control channel (PSCCH), first sidelink control information (SCI) for scheduling of a physical sidelink shared channel (PSSCH) and second SCI, based on a first sidelink (SL) resource within a period allocated by the CG. In step S1130, the first device may transmit, to the second device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI.

For example, the information related to the active state may be information requesting the second device to operate in the active state.

For example, retransmission of the MAC PDU may be monitored by the second device within an active time based on the information related to the active state.

For example, based on the information related to the active state, a SL discontinuous reception (DRX) hybrid automatic repeat request (HARQ) round trip time (RTT) timer may be started by the second device, and a SL DRX retransmission timer may be started by the second device after the SL DRX HARQ RTT timer expires.

For example, based on that the first SL resource is not the last SL resource among the at least one SL resource within the period, the information related to the active state may not be included in the first SCI or the second SCI.

For example, information regarding a maximum number of transmissions related to the CG may be received through the RRC message.

For example, based on that a number of SL transmissions performed within the period is less than the maximum number of transmissions, the information related to the active state may be included in the first SCI or the second SCI. For example, the number of SL transmissions may include a number of dropped SL transmissions and a number of performed SL transmissions. For example, the number of SL transmissions may include a number of performed SL transmissions and may not include a number of dropped SL transmissions. For example, based on that HARQ feedback is disabled for the MAC PDU, the information related to the active state may be included in the first SCI or the second SCI. For example, based on that the maximum number of transmissions is less than a number of SL resources within the period allocated by the CG, the information related to the active state may be included in the first SCI or the second SCI.

For example, information related to a physical uplink control channel (PUCCH) resource may be received through the RRC message or the DCI. Additionally, for example, the first device may transmit, to the base station, negative acknowledgment (NACK) based on the PUCCH resource, and may receive, from the base station, DCI including information related to a second SL resource for retransmission of the MAC PDU. For example, the second SL resource may be allocated to be included in an active time in which the second device operates in the active state based on the information related to the active state.

The proposed method may be applied to the device(s) based on various embodiments of the present disclosure. First, the processor 102 of the first device 100 may control the transceiver 106 to receive, from a base station, information related to a configured grant (CG), through at least one of downlink control information (DCI) or a radio resource control (RRC) message. In addition, the processor 102 of the first device 100 may control the transceiver 106 to transmit, to a second device through a physical sidelink control channel (PSCCH), first sidelink control information (SCI) for scheduling of a physical sidelink shared channel (PSSCH) and second SCI, based on a first sidelink (SL) resource within a period allocated by the CG. In addition, the processor 102 of the first device 100 may control the transceiver 106 to transmit, to the second device through the PSSCH, the second SCI and a medium access control (MAC) protocol data unit (PDU, based on the first SL resource within the period. For example, based on that the first SL resource is a last SL resource among at least one SL resource within the period, information related to an active state may be included in the first SCI or the second SCI.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to a configured grant (CG), through at least one of downlink control information (DCI) or a radio resource control (RRC) message; transmit, to a second device through a physical sidelink control channel (PSCCH), first sidelink control information (SCI) for scheduling of a physical sidelink shared channel (PSSCH) and second SCI, based on a first sidelink (SL) resource within a period allocated by the CG; and transmit, to the second device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: receive, from a base station, information related to a configured grant (CG), through at least one of downlink control information (DCI) or a radio resource control (RRC) message; transmit, to a second UE through a physical sidelink control channel (PSCCH), first sidelink control information (SCI) for scheduling of a physical sidelink shared channel (PSSCH) and second SCI, based on a first sidelink (SL) resource within a period allocated by the CG; and transmit, to the second UE through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI.

Based on an embodiment of the present disclosure, a non-transitory computer-readable storage medium storing instructions may be provided. For example, the instructions, when executed, may cause a first device to: receive, from a base station, information related to a configured grant (CG), through at least one of downlink control information (DCI) or a radio resource control (RRC) message; transmit, to a second device through a physical sidelink control channel (PSCCH), first sidelink control information (SCI) for scheduling of a physical sidelink shared channel (PSSCH) and second SCI, based on a first sidelink (SL) resource within a period allocated by the CG; and transmit, to the second device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI.

Figure 12:
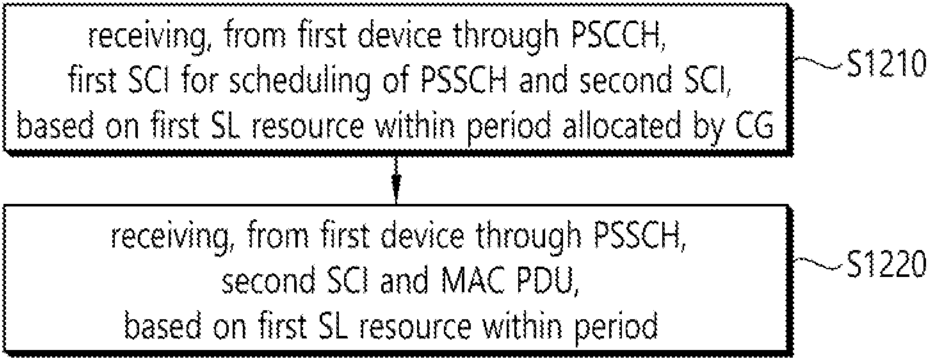
FIG. 12 shows a method for a second device to perform wireless communication, based on an embodiment of the present disclosure.

FIG. 12 shows a method for a second device to perform wireless communication, based on an embodiment of the present disclosure. The embodiment of FIG. 12 may be combined with various embodiments of the present disclosure.

Referring to FIG. 12, in step S1210, the second device may receive, from a first device through a physical sidelink control channel (PSCCH), first sidelink control information (SCI) for scheduling of a physical sidelink shared channel (PSSCH) and second SCI, based on a first sidelink (SL) resource within a period allocated by a configured grant (CG). In step S1220, the second device may receive, from the first device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI, and an active time of the second device may be determined based on the information related to the active state.

For example, the first device may receive, from a base station, information related to the CG through at least one of downlink control information (DCI) or a radio resource control (RRC) message.

For example, the information related to the active state may be information requesting the second device to operate in the active state.

For example, retransmission of the MAC PDU may be monitored by the second device within an active time based on the information related to the active state.

For example, based on the information related to the active state, a SL discontinuous reception (DRX) hybrid automatic repeat request (HARQ) round trip time (RTT) timer may be started by the second device, and a SL DRX retransmission timer may be started by the second device after the SL DRX HARQ RTT timer expires.

For example, based on that the first SL resource is not the last SL resource among the at least one SL resource within the period, the information related to the active state may not be included in the first SCI or the second SCI.

For example, information regarding a maximum number of transmissions related to the CG may be received through the RRC message.

For example, based on that a number of SL transmissions performed within the period is less than the maximum number of transmissions, the information related to the active state may be included in the first SCI or the second SCI. For example, the number of SL transmissions may include a number of dropped SL transmissions and a number of performed SL transmissions. For example, the number of SL transmissions may include a number of performed SL transmissions and may not include a number of dropped SL transmissions. For example, based on that HARQ feedback is disabled for the MAC PDU, the information related to the active state may be included in the first SCI or the second SCI. For example, based on that the maximum number of transmissions is less than a number of SL resources within the period allocated by the CG, the information related to the active state may be included in the first SCI or the second SCI.

For example, information related to a physical uplink control channel (PUCCH) resource may be received through the RRC message or the DCI. Additionally, for example, the first device may transmit, to the base station, negative acknowledgment (NACK) based on the PUCCH resource, and may receive, from the base station, DCI including information related to a second SL resource for retransmission of the MAC PDU. For example, the second SL resource may be allocated to be included in an active time in which the second device operates in the active state based on the information related to the active state.

The proposed method may be applied to the device(s) based on various embodiments of the present disclosure. First, the processor 202 of the second device 200 may control the transceiver 206 to receive, from a first device through a physical sidelink control channel (PSCCH), first sidelink control information (SCI) for scheduling of a physical sidelink shared channel (PSSCH) and second SCI, based on a first sidelink (SL) resource within a period allocated by a configured grant (CG). In addition, the processor 202 of the second device 200 may control the transceiver 206 to receive, from the first device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI, and an active time of the second device may be determined based on the information related to the active state.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), first sidelink control information (SCI) for scheduling of a physical sidelink shared channel (PSSCH) and second SCI, based on a first sidelink (SL) resource within a period allocated by a configured grant (CG); and receive, from the first device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI, and an active time of the second device may be determined based on the information related to the active state.

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: receive, from a first UE through a physical sidelink control channel (PSCCH), first sidelink control information (SCI) for scheduling of a physical sidelink shared channel (PSSCH) and second SCI, based on a first sidelink (SL) resource within a period allocated by a configured grant (CG); and receive, from the first UE through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI, and an active time of the second UE may be determined based on the information related to the active state.

Based on an embodiment of the present disclosure, a non-transitory computer-readable storage medium storing instructions may be provided. For example, the instructions, when executed, may cause a second device to: receive, from a first device through a physical sidelink control channel (PSCCH), first sidelink control information (SCI) for scheduling of a physical sidelink shared channel (PSSCH) and second SCI, based on a first sidelink (SL) resource within a period allocated by a configured grant (CG); and receive, from the first device through the PSSCH, the second SCI and a medium access control (MAC) protocol data unit (PDU), based on the first SL resource within the period. For example, based on that the first SL resource is a last SL resource among at least one SL resource within the period, information related to an active state may be included in the first SCI or the second SCI, and an active time of the second device may be determined based on the information related to the active state.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
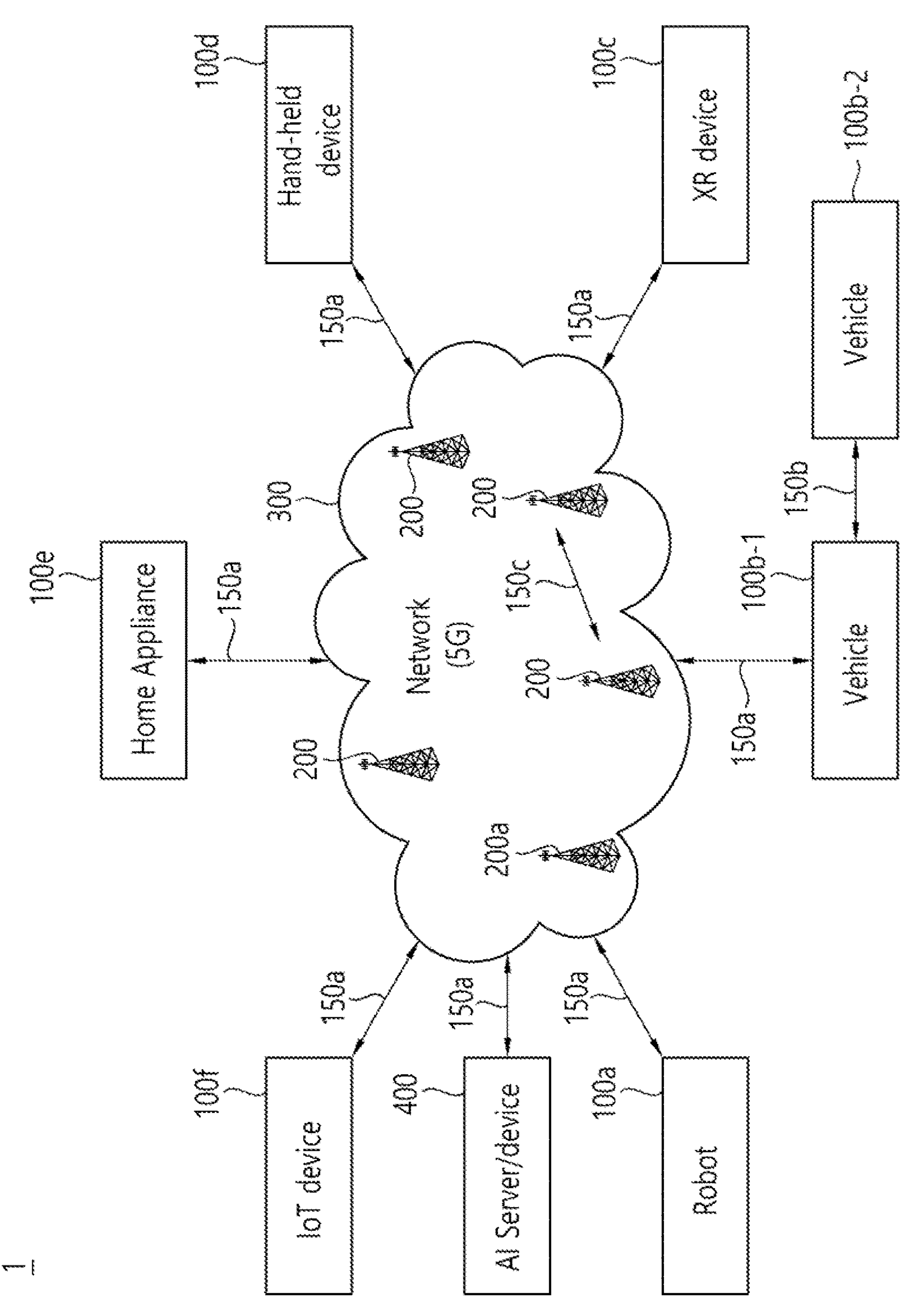
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IOT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IOT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100_a_ to 100_f_ of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100_a_ to 100_f_ may be connected to the network 300 via the BSs 200. An AI technology may be applied to the wireless devices 100_a_ to 100_f_ and the wireless devices 100_a_ to 100_f_ may be connected to the AI server 400 via the network 300. The network 300 may be configured using a 3G network, a 4G (e.g., LTE) network, or a 5G (e.g., NR) network. Although the wireless devices 100_a_ to 100_f_ may communicate with each other through the BSs 200/network 300, the wireless devices 100_a_ to 100_f_ may perform direct communication (e.g., sidelink communication) with each other without passing through the BSs/network. For example, the vehicles 100_b_-1 and 100_b_-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100_a_ to 100_f_.

Wireless communication/connections 150_a_, 150_b_, or 150_c_ may be established between the wireless devices 100_a_ to 100_f_/BS 200, or BS 200/BS 200. Herein, the wireless communication/connections may be established through various RATs (e.g., 5G NR) such as uplink/downlink communication 150_a_, sidelink communication 150_b_ (or, D2D communication), or inter BS communication (e.g. relay; Integrated Access Backhaul (IAB)). The wireless devices and the BSs/the wireless devices may transmit/receive radio signals to/from each other through the wireless communication/connections 150_a_ and 150_b_. For example, the wireless communication/connections 150_a_ and 150_b_ may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
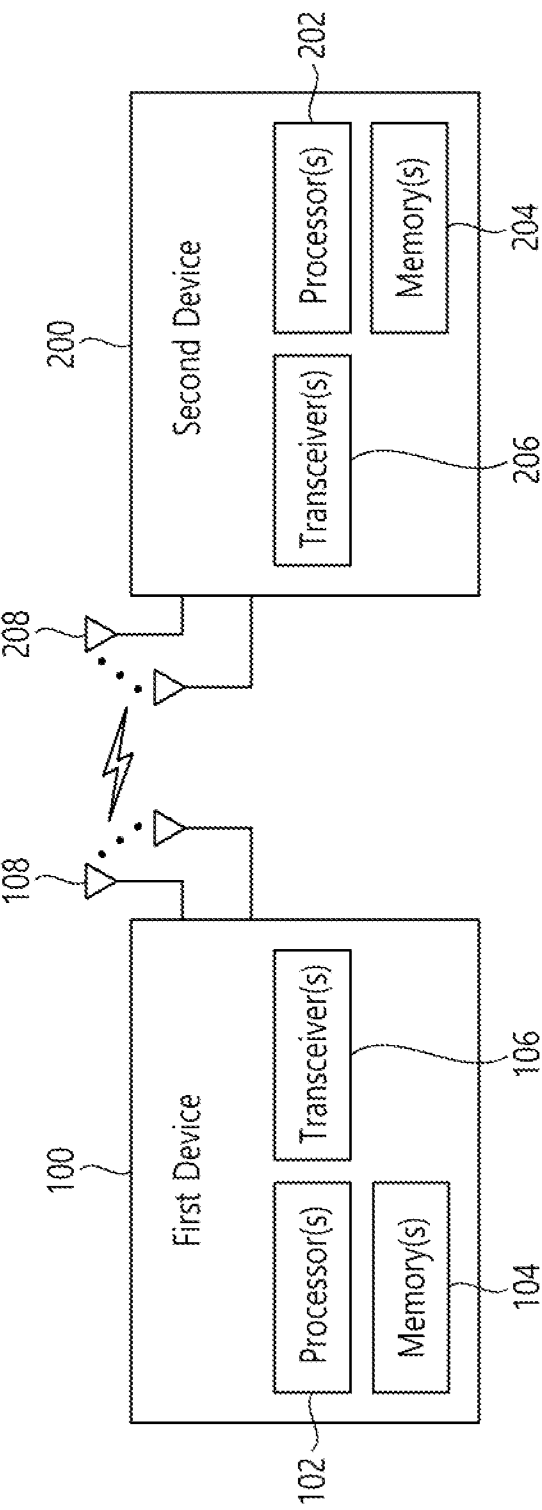
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100_x_ and the BS 200} and/or {the wireless device 100_x_ and the wireless device 100_x_} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
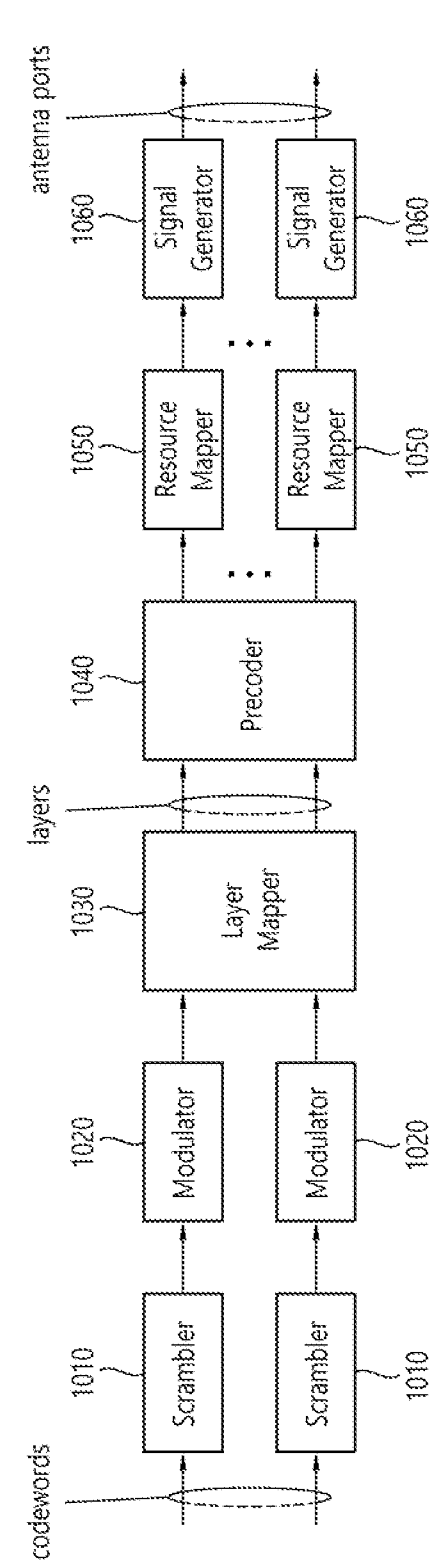
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters. Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
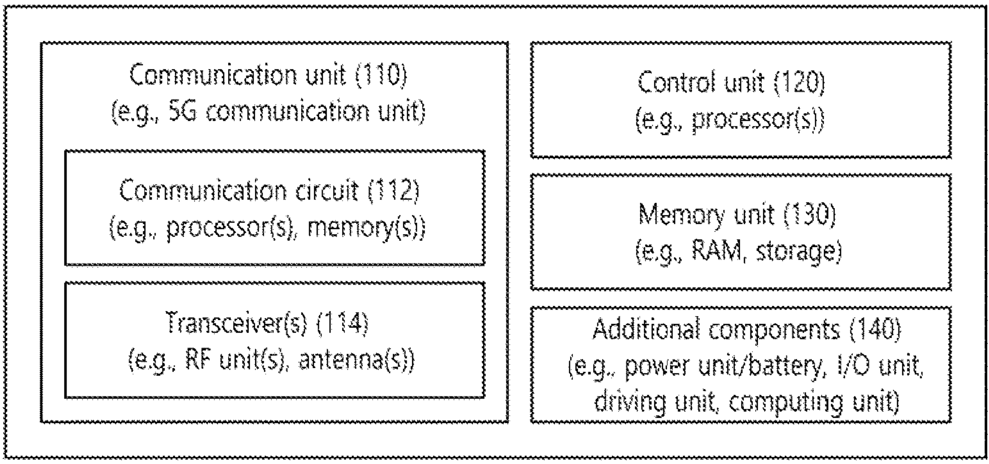
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
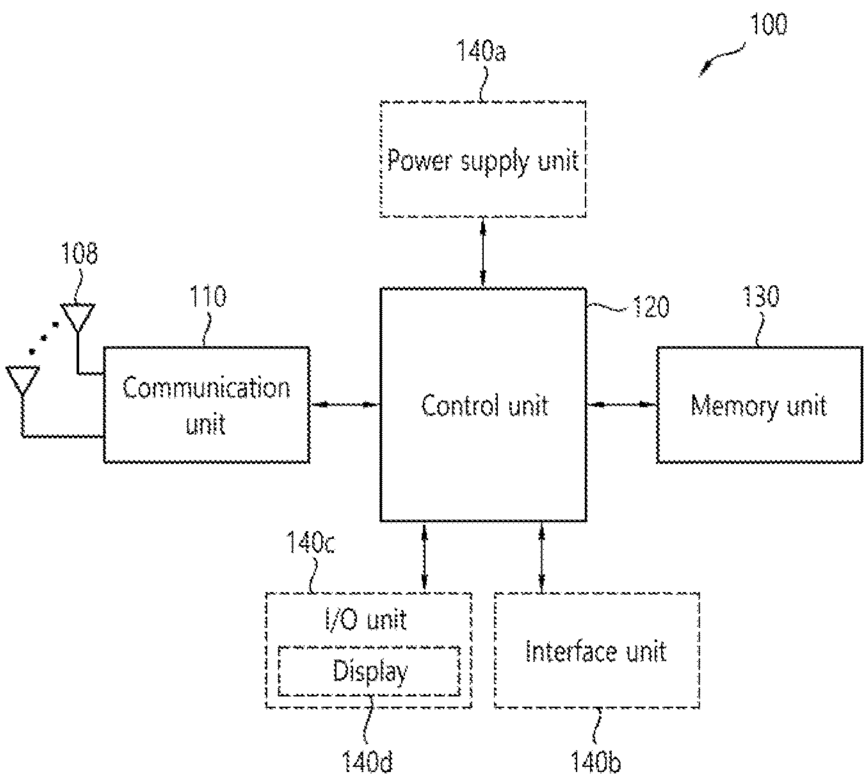
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

receiving, by a first device from a base station, information regarding a maximum number of sidelink (SL) transmissions related to a configured grant (CG);

transmitting, by the first device to a second device, through a physical sidelink control channel (PSCCH), first sidelink control information (SCI) for scheduling of a physical sidelink shared channel (PSSCH) and second SCI; and transmitting, by the first device to the second device, through the PSSCH, the second SCI and a medium access control (MAC) protocol data unit (PDU), wherein the first SCI, the second SCI, and the MAC PDU are transmitted based on a first SL resource within a period of the CG, and wherein, based on that a number of SL transmissions performed within the period is less than the maximum number of SL transmissions, information related to an active state is included in the first SCI or the second SCI.

2. The method of claim 1, wherein the information related to the active state is information requesting the second device to operate in the active state.

3. The method of claim 1, wherein retransmission of the MAC PDU is monitored by the second device within an active time based on the information related to the active state.

4. The method of claim 1, wherein, based on the information related to the active state, a SL discontinuous reception (DRX) hybrid automatic repeat request (HARQ) round trip time (RTT) timer is started by the second device, and a SL DRX retransmission timer is started by the second device after the SL DRX HARQ RTT timer expires.

5. The method of claim 1, wherein the number of SL transmissions includes a number of dropped SL transmissions and a number of performed SL transmissions.

6. The method of claim 1, wherein the number of SL transmissions includes a number of performed SL transmissions and does not include a number of dropped SL transmissions.

7. The method of claim 1, wherein, based on that HARQ feedback is disabled for the MAC PDU, the information related to the active state is included in the first SCI or the second SCI.

8. The method of claim 1, wherein, based on that the maximum number of SL transmissions is less than a number of SL resources within the period allocated by the CG, the information related to the active state is included in the first SCI or the second SCI.

9. The method of claim 1, wherein information related to a physical uplink control channel (PUCCH) resource is received from the base station.

10. The method of claim 9, further comprising:

transmitting, by the first device to the base station, negative acknowledgment (NACK) based on the PUCCH resource; and receiving, by the first device from the base station, downlink control information (DCI) including information related to a second SL resource for retransmission of the MAC PDU, wherein the second SL resource is allocated to be included in an active time in which the second device operates in the active state based on the information related to the active state.

11. A first device, comprising:

at least one transceiver;

at least one processor; and at least one memory connected to the at least one processor and storing instructions that, based on being executed, cause the first device to perform operations comprising:

receiving, from a base station, information regarding a maximum number of sidelink (SL) transmissions related to a configured grant (CG);

transmitting, to a second device, through a physical sidelink control channel (PSCCH), first sidelink control information (SCI) for scheduling of a physical sidelink shared channel (PSSCH) and second SCI; and transmitting, to the second device, through the PSSCH, the second SCI and a medium access control (MAC) protocol data unit (PDU), wherein the first SCI, the second SCI, and the MAC PDU are transmitted based on a first SL resource within a period of the CG, and wherein, based on that a number of SL transmissions performed within the period is less than the maximum number of SL transmissions, information related to an active state is included in the first SCI or the second SCI.

12. The first device of claim 11, wherein the information related to the active state is information requesting the second device to operate in the active state.

13. The first device of claim 11, wherein retransmission of the MAC PDU is monitored by the second device within an active time based on the information related to the active state.

14. The first device of claim 11, wherein, based on the information related to the active state, a SL discontinuous reception (DRX) hybrid automatic repeat request (HARQ) round trip time (RTT) timer is started by the second device, and a SL DRX retransmission timer is started by the second device after the SL DRX HARQ RTT timer expires.

15. A processing device comprising:

at least one processor; and at least one memory connected to the at least one processor and storing instructions that, based on being executed, cause a first device to perform operations comprising:

receiving, from a base station, information regarding a maximum number of sidelink (SL) transmissions related to a configured grant (CG)-information related to a configured grant (CG), through at least one of downlink control information (DCI) or a radio resource control (RRC) message;

transmitting, to a second device, through a physical sidelink control channel (PSCCH), first sidelink control information (SCI) for scheduling of a physical sidelink shared channel (PSSCH) and second SCI; and transmitting, to the second device, through the PSSCH, the second SCI and a medium access control (MAC) protocol data unit (PDU), wherein the first SCI, the second SCI, and the MAC PDU are transmitted based on a first SL resource within a period of the CG, and wherein, based on that a number of SL transmissions performed within the period is less than the maximum number of SL transmissions, information related to an active state is included in the first SCI or the second SCI.

16. The processing device of claim 15, wherein the information related to the active state is information requesting the second device to operate in the active state.

17. The processing device of claim 15, wherein retransmission of the MAC PDU is monitored by the second device within an active time based on the information related to the active state.

* * * * *